United States Patent [19]

Satou

[11] Patent Number: 5,253,139
[45] Date of Patent: Oct. 12, 1993

[54] PORTABLE ELECTRONIC APPARATUS HAVING A DETACHABLE DISPLAY UNIT AND A SOCKET LID

[75] Inventor: Youji Satou, Tokyo, Japan

[73] Assignee: Kabushiki Kaisha Toshiba, Kawasaki, Japan

[21] Appl. No.: 965,528

[22] Filed: Oct. 23, 1992

Related U.S. Application Data

[63] Continuation of Ser. No. 853,861, Mar. 20, 1992, abandoned, which is a continuation of Ser. No. 577,544, Sep. 5, 1990, abandoned.

[30] Foreign Application Priority Data

Oct. 31, 1989 [JP] Japan .................. 1-283721

[51] Int. Cl.$^5$ .................. H05K 5/02; H05K 7/10; H01R 13/447
[52] U.S. Cl. .................. 361/681; 361/680; 439/136; 439/164; 292/300
[58] Field of Search .................. 248/917-923; 364/708; 439/135, 136, 142, 164, 165; D14/100, 101, 106, 114, 115; 292/300; 220/306, 356; 361/380, 390-395, 399

[56] References Cited

U.S. PATENT DOCUMENTS

| | | |
|---|---|---|
| D. 290,256 | 6/1987 | Sapper . |
| 3,781,495 | 12/1973 | Splingaerd .................. 439/136 X |
| 3,956,573 | 5/1976 | Myers et al. .................. 439/135 X |
| 4,370,013 | 1/1983 | Niitsu et al. . |
| 4,528,597 | 7/1985 | Klein et al. . |
| 4,571,456 | 2/1986 | Paulsen et al. . |
| 4,680,674 | 7/1987 | Moore et al. . |
| 4,749,364 | 6/1988 | Arney et al. .................. 439/372 |

FOREIGN PATENT DOCUMENTS

| | | |
|---|---|---|
| 0078895 | 5/1983 | European Pat. Off. . |
| 3143932 | 5/1983 | Fed. Rep. of Germany ...... 358/254 |
| 3143960 | 5/1983 | Fed. Rep. of Germany ...... 439/135 |
| 0223022 | 5/1985 | German Democratic Rep. .................. 439/136 |
| 55-48610 | 12/1980 | Japan . |
| 1482707 | 8/1977 | United Kingdom . |

OTHER PUBLICATIONS

"Removable Liquid Crystal Display Mounting System", IBM Technical Disclosure Bulletin, vol. 29, No. 10, Mar., 1987, pp. 4271–4272.

"Removable Liquid Crystal Display for a Personal Computer", IBM Technical Disclosure Bulletin, vol. 29, No. 10, Mar. 1987, pp. 4273–4274.

Primary Examiner—Leo P. Picard
Assistant Examiner—Michael W. Phillips
Attorney, Agent, or Firm—Finnegan, Henderson, Farabow, Garrett & Dunner

[57] ABSTRACT

A portable electronic apparatus includes a pivotal display unit, detachably mounted to the base of the apparatus in a pivotal socket. A lid is provided to cover the socket at times when the display unit is removed. A lid storing recess is provided in the apparatus to store the lid at times when the display unit is installed in the socket, or any other tie the lid is not covering the socket opening. The lid may also prevent rotation of the socket.

7 Claims, 9 Drawing Sheets

PORTABLE ELECTRONIC APPARATUS HAVING A DETACHABLE DISPLAY UNIT AND A SOCKET LID

This application is a continuation of application Ser. No. 07/853,861 filed Nov. 20, 1992 now abandoned which is a continuation of Ser. No. 07/577,544 filed Sep. 5, 1990 now abandoned.

BACKGROUND OF THE INVENTION

1. Field of the Invention

The present invention relates to a portable electronic apparatus such as a lap-top personal computer or word processor, more particularly, to a portable electronic apparatus in which a flat panel display unit is detachable from a base body.

2. Description of the Related Art

Recently, a sharp increase is being achieved in the demands for a lap-top portable computer or portable word processor having a flat panel display unit. As described in, for example, U.S. Pat. No. 4,749,364, such a lap-top portable electronic apparatus comprises a base body having a keyboard integrally attached thereto and a flat panel display unit mounted to the base body. The display unit is swingably mounted to the base body with a hinge. When the apparatus is not used, the display unit is folded and superposed on the base body. In using the apparatus, the display unit can be swung upward about the mounted portion to assume a posture suitable for observation by the operator.

The display unit, when superposed on the keyboard of the base body, also acts as a lid of the keyboard. In this case, the entire electronic apparatus is of a substantially flat shape like, for example, a book, with the result that the entire apparatus can be made compact.

The portable electronic apparatus comprises in general a liquid crystal display unit (LCD) or a plasma display unit. In any type of the conventional display unit, a single color is used for the display of the picture image. For example, the picture image is displayed in black over a white background or over a green background. In other words, it is impossible to use a plurality of colors for the display purpose.

However, it is desirable in some cases to use a display unit of multi-color display type while using the keyboard of a portable electronic apparatus in operating, for example, a portable personal computer. In such a case, an electrical lead wire is withdrawn from the back or side surface of the base body of the portable personal computer and is electrically connected to the multi-color display unit, and the single color display unit is detached from the base body of the portable personal computer. To make the single color display unit detachable from the base body, it is known to the art that a socket is mounted to the base body, and a plug formed in the single color display unit is detachably connected to the socket. The socket is swingably mounted to the base body with a hinge to make the display unit swingable relative to the base body.

Where the single color display unit is detached from the socket of the base body in preparation for use of a multi-color display unit, the opening of the socket for receiving the plug is exposed to the outside. As a result, the appearance is impaired. In addition, a connector housed in the socket for electrically connecting the single color display unit to the base body is also exposed to the outside. In this case, dust may settle on the connector, with the result that, when the display unit is connected again to the base body, the electrical and mechanical connection tends to be made unsatisfactory.

Under the circumstances, the opening of the socket is covered with a lid in the conventional apparatus. However, the lid is unnecessary where the display unit is connected to the base body. At these times the lid is stored in a pocket formed in a wrapping box of the portable electronic apparatus. However, the wrapping box is discarded in some cases. Of course, the lid also tends to be discarded together with the wrapping box. It is certainly possible to store the lid independently. If the lid is stored somewhere away from the base body, however, the operator may possibly fail to remember where the lid is stored. Naturally, it takes time for the operator to find the lid, when the operator wishes to mount the lid to close the opening of the socket.

SUMMARY OF THE INVENTION

An object of the present invention is to provide a portable electronic apparatus in which the lid serving to cover the opening of a socket when the display unit is detached is prevented from being lost and the opening can be promptly covered with the lid, when required.

According to the present invention, there is provided a portable electronic apparatus, comprising:

a base body having a socket storage portion;

a display unit having a display;

a socket having an opening, provided on the socket storage portion and swingably mounted to the base body;

a plug mounted to the display unit and detachably fitted into the socket, said display unit being detachably joined and swingably mounted to the base body by fitting the plug into the socket;

electrical connecting means for electrically connecting said display unit to the base body by fitting the plug into the socket;

a lid serving to cover the opening of the socket when the display unit is detached from the base body by removing the plug from the socket;

mechanical connecting means for detachably connecting said lid to the socket; and a lid storing means for storing the lid when removed from the opening of the socket.

Where the display unit is detached from the base body, the opening of the socket can be covered with the lid. On the other hand, where the display unit is connected to the base body, the lid removed from the opening portion of the socket can be held in the storing means. Naturally loss of the lid need not be worried about. Also, the opening of the socket can be promptly closed with the lid, when desired.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

FIGS. 1 to 8 collectively show a lap-top portable computer according to a first embodiment of the present invention. As seen from the drawings, the portable computer comprises a base body 10 formed by joining a bottom case 11 and a top cover 12 each made of synthetic resin. The top cover 12 consists of a front top cover 121 and a rear top cover 122. The height of the front top cover 121 is smaller than that of the rear top cover 122. In other words, the base body 10 is thicker in the rear portion than in the front portion.

A printed wiring substrate and various electronic parts (shown generally in FIGS. 5 and 5 by reference number 100) mounted to the substrate are housed in the space defined between the bottom case 11 and the top cover 12.

A keyboard 15 having a large number of keys 14 arranged therein is integrally mounted to the upper surface of the front top cover 121. A recess 20 acting as a socket storage portion is formed in the central portion at the front edge of the rear top cover 122 formed higher than the front top cover 121. A socket 30 is housed in the recess 20 noted above.

Figure 4:
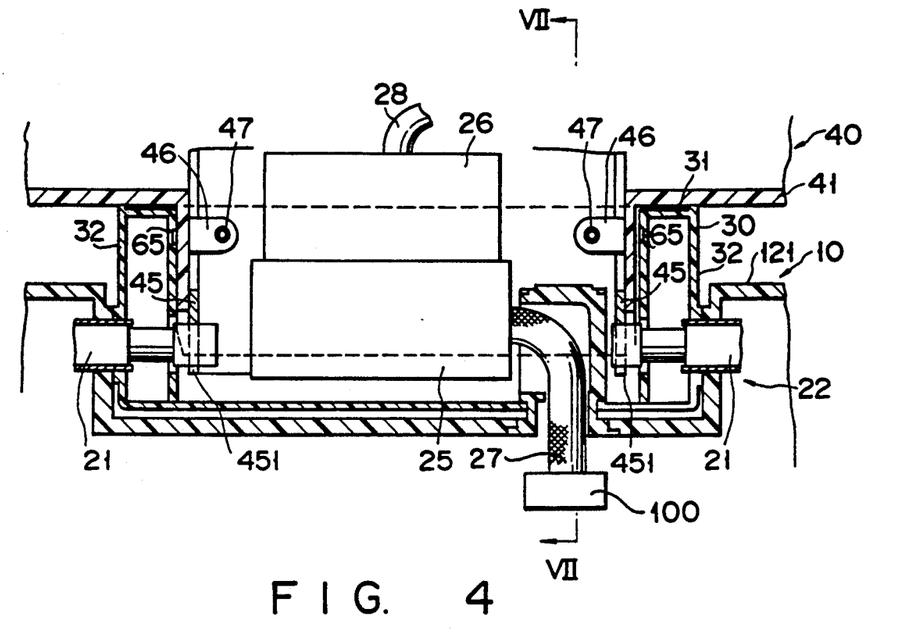
FIG. 4 is a cross sectional view along the line IV—IV shown in FIG. 1, connection of the plug and the socket being shown in FIG. 4.
Figure 5:
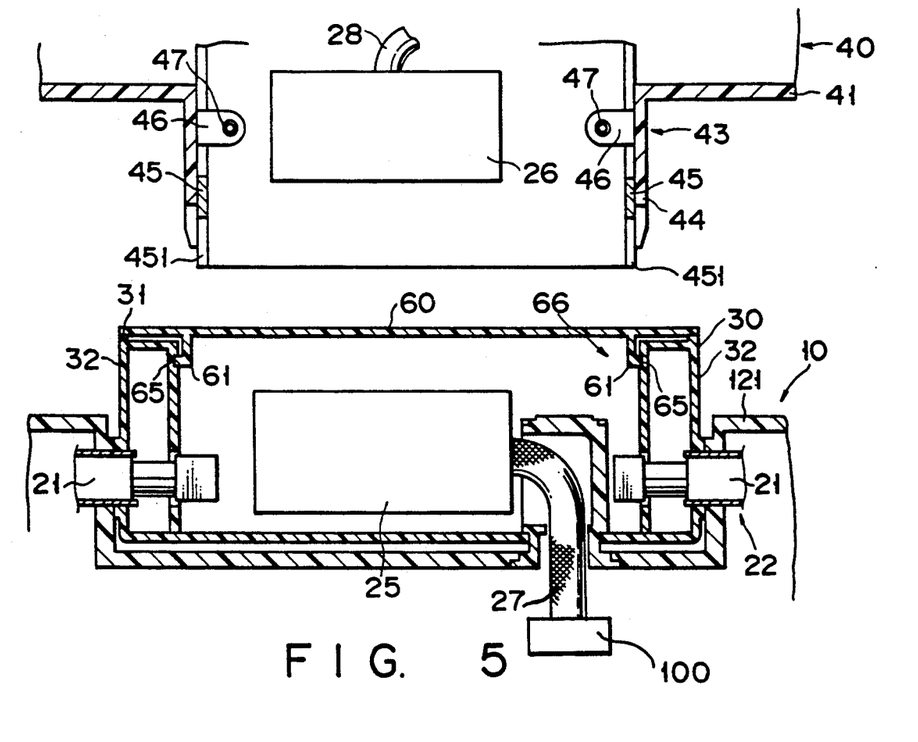
FIG. 5 is a cross sectional view showing the plug and the socket separately.
Figure 7:
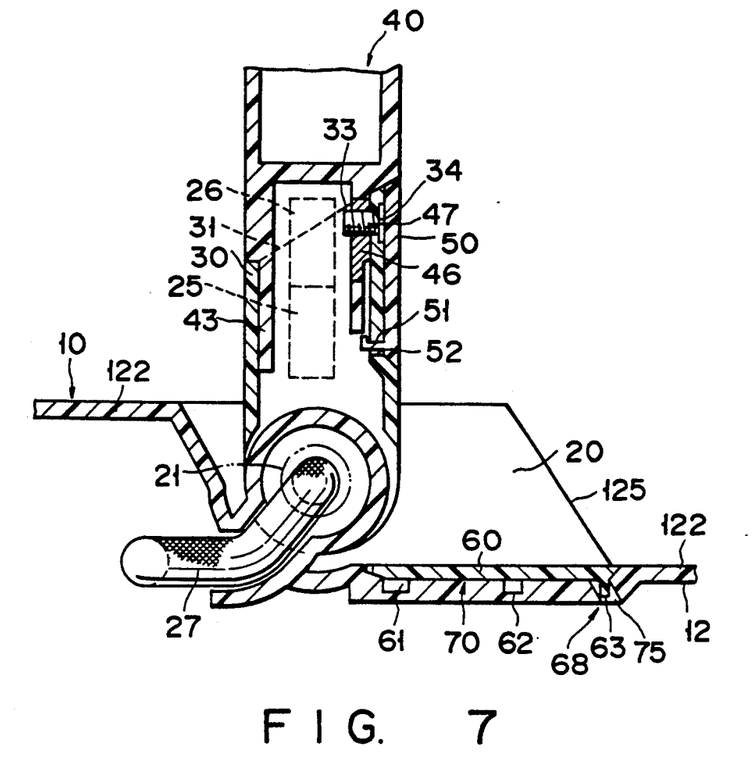
FIG. 7 is a cross sectional view along the line VII—VII of FIG. 4, connection of the plug and the socket being shown in FIG. 7.

The socket 30 is made of a synthetic resin and is box-shaped. An opening 31 is formed in the upper surface region of the socket 30. As seen from FIGS. 4 and 5, hollow walls 32 are formed to define the right and left sides of the socket 30. The base body 10 is provided with a hinge means 22, which consists of a pair of hinge shafts 21 as shown in FIGS. 4, 5, and 7. The hinge shaft 21 rotatably extends through the hollow wall 32 of the socket, with the result that the socket 30 mounted to the base body 10 is rotatable about the hinge shaft 21.

A flat panel display unit 40 is detachably mounted to the socket 30. The display unit 40, which is of a liquid crystal display type (LCD) or plasma display type, comprises a synthetic resin panel frame 41 and a display screen 42 formed in the central portion of the frame 41.

Further, a plug 43 extends downward from the lower end in the central portion of the frame 41. The plug 43 comprises a cylindrical insertion section 44 rectangular in cross section. The insertion section 44, which is removably inserted into the socket 30, comprises fork-shaped metal legs 45 formed at the right and left ends thereof. A slit 451 engaged with the hinge shaft 21 is formed at the lower end of each of these legs 45. Further, each of these legs 45 is provided with a fixing piece 46 positioned on the front surface of the insertion section 44. A screw hole 47 is formed in each of these fixing pieces 46.

Insertion holes 32 facing the screw holes 47 formed in the fixing pieces 46 are formed in the front surface region of the socket 30.

The plug 43 is fitted into the socket 30. In this case, the slits 451 formed in the fork-shaped metal legs 45 are engaged with the hinge shafts 21. As a result, the legs 45 are rotated together with the hinge shafts 21 so as to make the flat panel display unit 40 swingable relative to the base body 10. Under this condition, fixing screws 33 are inserted into the insertion holes 32 from the front surface of the socket 30. The fixing screws 33 are further screw-engaged with the screw holes 47 of the fixing pieces 46 so as to permit the plug 43 to be fitted into the socket 30. These fixing screws 33 can be operated on the front surface of the socket 30 for the engagement with and disengagement from the screw holes 47. A front cover plate 50 covers the head portions of there fixing screws 33.

The front cover plate 50 is removably mounted to the front surface of the socket 30. A plurality of claws 51 are formed in the front cover plate 50 for engagement with a plurality of holes 52 formed in the front wall of the socket 30. If the front cover plate 50 is removed, the head portions of the fixing screws 33 are exposed to the outside, making it possible to operate the fixing screw 33 for the engagement with and disengagement from the screw holes 47.

After operation of the fixing screws 33, the claws 51 are engaged with the holes 52 so as to fix the front cover plate 50 to the front surface of the socket 30, with the result that the heads of the fixing screws 33 are concealed from view. Where the screws 33 are not used, the insertion holed 34 are covered with the front cover plate 50, leading to a good appearance of the apparatus.

Figure 2:
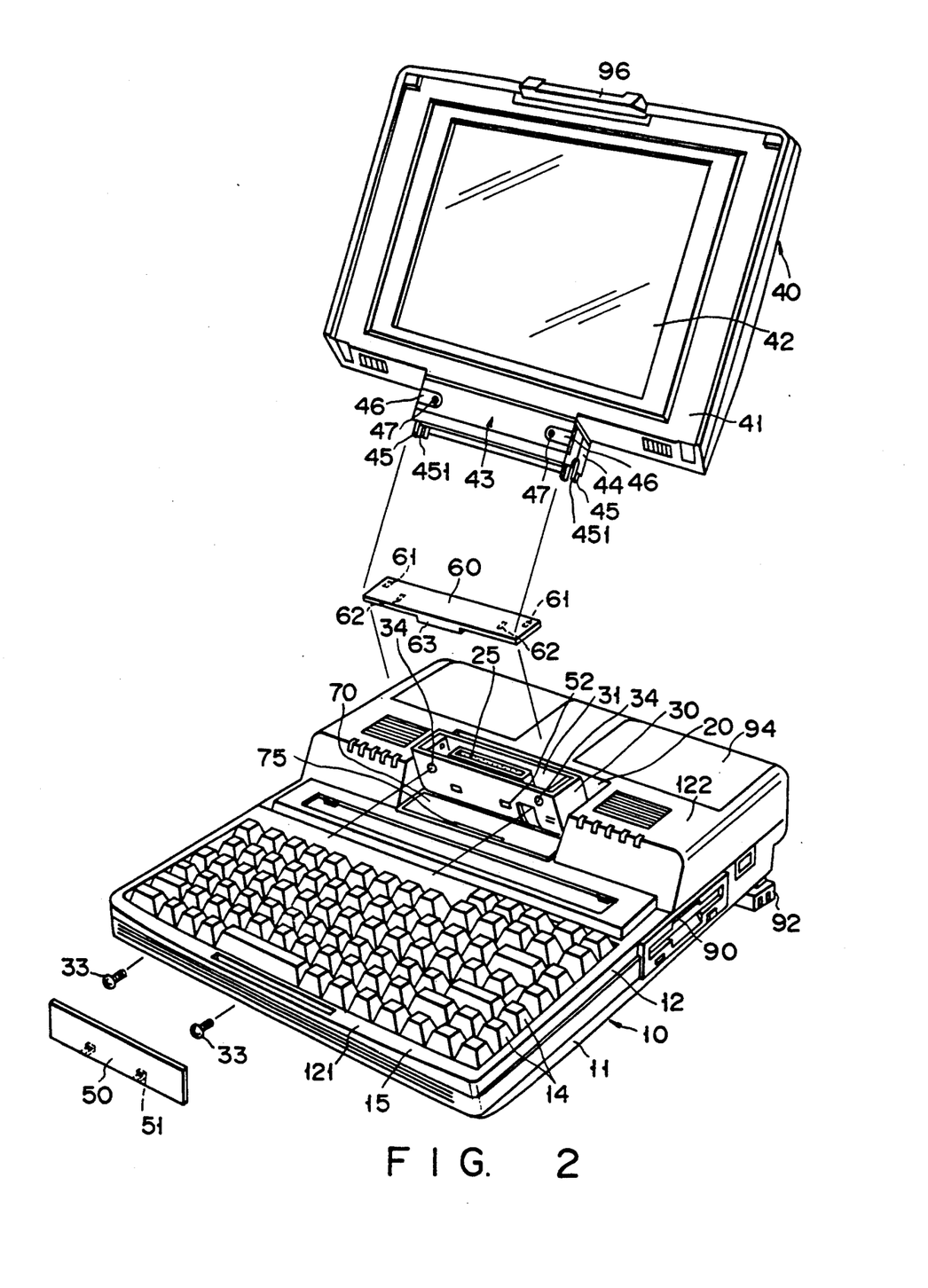
FIG. 2 is an oblique view showing that a flat panel display unit is separated from the base body of the portable computer shown in FIG. 1.

If the plug 43 of the display unit 40 is withdrawn from the socket 30 by operating the fixing screws 33, the display unit 40 is detached from the base body 10, as shown in FIGS. 2 and 5. In this case, the opening 31 in the upper surface region of the socket 30 is exposed to the outside.

Figure 6:
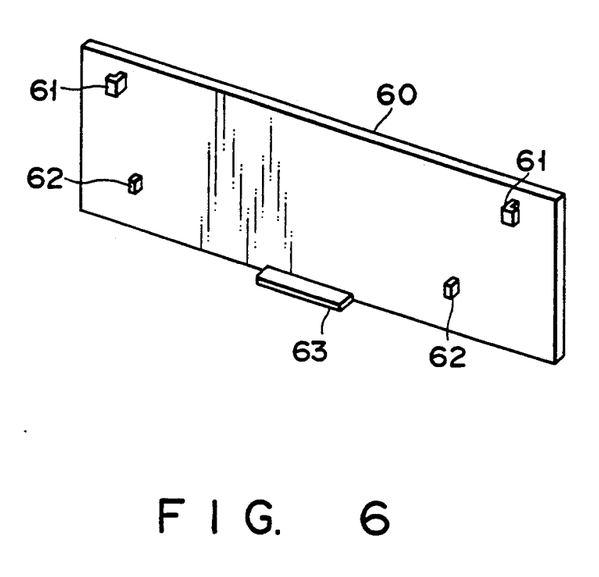
FIG. 6 is an oblique view showing the lid.

FIGS. 4, 5 and 7 show connectors 25 and 26 each constituting an electronical connecting means. The connector 25 is mounted inside the socket 30 of the base body 10 and the connector 26 is mounted inside the plug 43 of the display unit 40. These connectors 25 and 26 are connected to cables 27 and 28, respectively. Further, these cables 27 and 28 are electrically connected to the electronic parts (shown generally in FIGS. 4 and 5 by reference number 100) inside the base body 10 and inside the display unit 40. If the plug 43 is inserted into the socket 30, these connectors 25 and 26 are connected to each other so as to permit an electrical connection between the electronic parts inside the base body 10 and those inside the display unit 40. Incidentally, the connection of the connectors 25 and 26 accompanies the insertion of the plug 43 into the socket 30.

Where the display unit 40 is detached from the base body 10, the upper surface of the socket 30 is made open to provide the opening 31. The opening is covered with a lid 60. The lid 60, which is made of a synthetic resin, is of a plate shape of a size adapted for closing the opening 31 of the socket 30. A mechanical connecting means 66 is provided over the lid 60 and the socket 30. As shown in FIG. 6, the mechanical connecting means includes a plurality of claws 61, stopper projections 62 and a joining piece 63 which are formed on the back surface of the lid 60, as well as recesses 65 formed in the socket 30.

Figure 8:
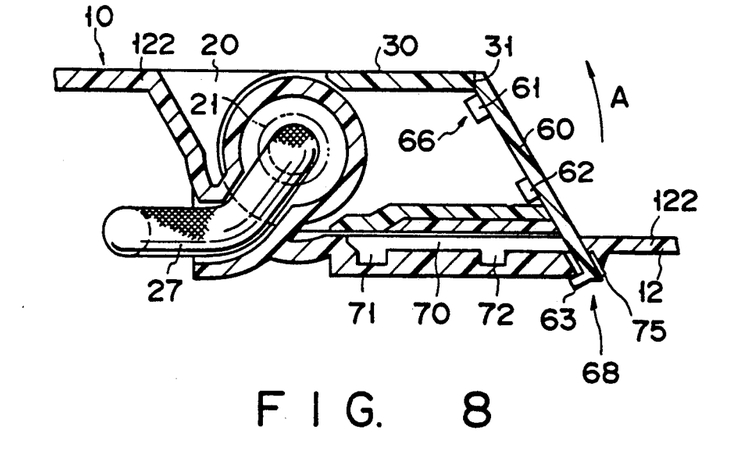
FIG. 8 is a cross sectional view showing that the lid is placed on the socket from which the plug has been removed.

When the lid 60 is placed to cover the opening 31 of the socket 30, the claws 61 are engaged with the recesses 65 formed within the hollow walls 32, as seen from FIGS. 4 and 5. During the engagement of the claws 61 with the recesses 65, the stopper projections 62 abut against the inner surface of the socket as shown in FIG. 8 so as to determine the position of the lid 60 and to prevent the lid 60 from being detached. As described later, the joining piece 63 of the lid 60 is engaged with a joining hole 75 made in the rear top cover 121, the engagement of joining hole 75 and joining piece 63 comprising an example of joining means 68 as shown for example in FIGS. 7 and 8.

When the opening 31 of the socket 30 is covered with the lid 60, the connector 25, etc. are concealed from view. If the socket 30 is swung forward after the covering of the opening 31 of the socket 30 with the lid 60, the joining piece 63 is caught by the joining hole 75 formed in the rear top cover 121 as shown in FIG. 8 so as to keep the socket 30 swung forward. In this case, the upper surface of the socket 3 is substantially flush with the upper surface of the rear top cover 122. In addition, the opening of the socket covered with the lid 60, i.e., the front surface of the lid 60, is substantially flush with the inclined front surface of the rear top cover 122. It follows that the socket is housed in the recess 20 formed in the center of the front portion of the rear top cover 122 and, thus, does not protrude upward or forward.

The base body 10 is provided with a storing means 70 for storing the lid 60 after removal of the lid 60 from the socket 30. The storing means 70 is formed in the rear top cover 122 of the base body 10. When the socket 30 is swung forward, the holding portion 70 is positioned below the socket 30. The storing portion 70 is recessed to receive the lid 60 in its horizontal posture, and the depth of the recess is determined to permit the upper surface of the lid 60, when housed therein, to be substantially flush with the upper surface of the rear top cover 122.

A groove 71 serving to receive the claws 61 formed on the back surface of the lid 60 is formed in the bottom of the holding portion 70. Also formed in the bottom of the holding portion 70 is a groove 72 serving to receive the stopper projections 62. The joining hole 75 referred to previously is formed to face the joining piece 63. Of course, the joining piece 63 is caught by the joining hole 75.

When the plug 43 of the flat panel display unit 40 is inserted into the socket 30, the lid 60 is detached from the socket 30 and is housed in the housing section 70. In this case, the claw 61 of the lid 60 is housed in the groove 71, the stopper projections 62 are housed in the groove 72, and the joining piece 63 is housed in the joining hole 75. As a result, the lid 60 is housed in the storing portion such that the upper surface of the lid 60 is substantially flush with the upper surface of the rear top cover 122. In addition, the lid 60 is immovably fixed by the engagements between the claw 61 and the groove 71, between the stopper projections 62 and the groove 72 and between the joining piece 63 and the joining hole 75.

Figure 1:
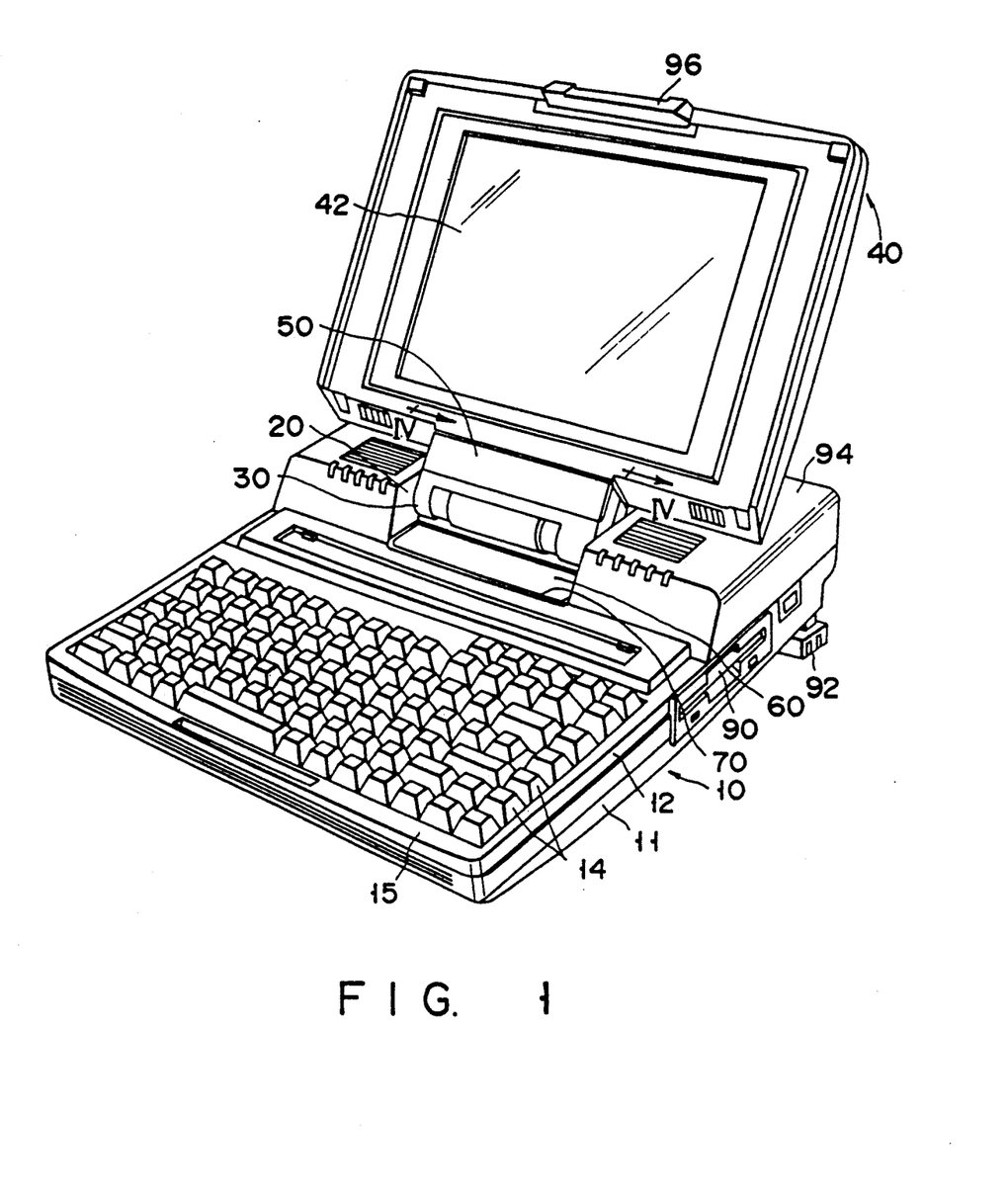
FIG. 1 is an oblique view showing the entire portable computer according to a first embodiment of the present invention.
Figure 3:
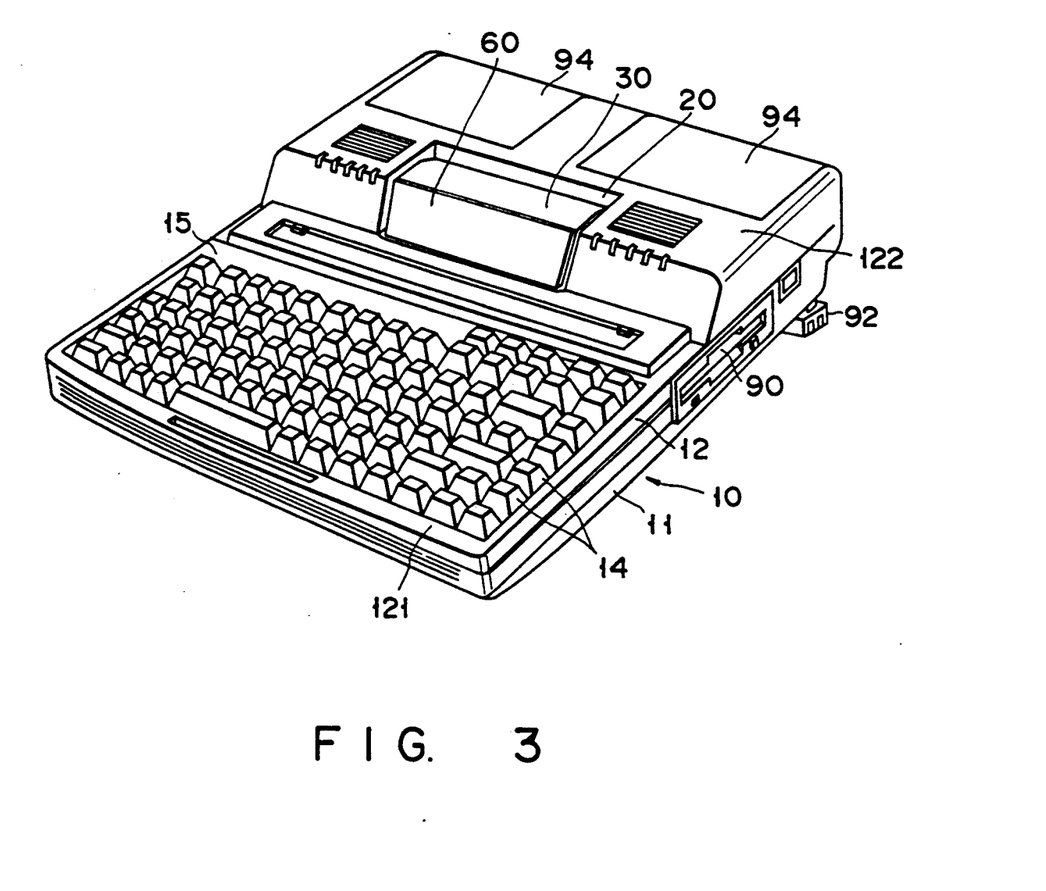
FIG. 3 is an oblique view showing that a lid is placed on the socket in the portable computer shown in FIG. 2.

As seen from FIGS. 1 to 3, the lap-top portable computer of this embodiment further comprises an inlet port 90 of a floppy disk, a leg 92 for tilt-up, a battery 94 acting as a driving power source and a latch 96.

The lap-top portable computer of the construction described above is operated as described below. In operating the portable computer, it is possible to use a multi-color display unit (not shown) in place of the flat panel display unit 40. In using the color display unit, the flat panel display unit 40 is detached first. Then, an electrical lead wire is taken out through a connector (not shown) from the back surface of the base body 10. The lead wire is connected to the color display unit so as to electrically connect the base body 10 to the color display unit.

When the display unit 40 is detached, the opening 31 of the socket 30 is exposed to the outside. Thus, the lid 60 is mounted to close the opening 31. Naturally, the connector 25, etc. inside the socket 30 are concealed from view, leading to a good appearance of the apparatus. In addition, the lid 60 prevents dust from entering the apparatus. With the opening 31 covered with the lid 60, the socket 30 is swung forward, with the result that the joining piece 68 is caught by the joining hole 75 formed in the rear top cover 122 as shown in FIG. 8. It follows that the socket 30 is kept swung forward. In this case, the upper surface of the socket 30 is substantially flush with the upper surface of the rear top cover 122. In addition, the opening covered with the lid 60, i.e., the front surface of the lid 60, is substantially flush with the inclined front surface 125 of the rear top cover 122. It follows that the socket 30 is housed in the recess 20 formed in the center of the front portion of the rear top cover 122 and, thus, does not protrude upward or forward. Further, the joining piece 63 is caught by the joining hole 75 formed in the rear top cover 122 as shown in FIG. 8. Thus, the socket 30 is kept swung forward and is prevented from rising in a direction denoted by an arrow A. It should be noted in this connection that the cable 27 is connected to the cable 25 housed in the socket 30. In some cases, the cable 27 is twisted, and the twisting is transmitted to the socket 30 so as to urge the socket 30 in the direction of arrow A. Further, the socket 30 tends to be vibrated upon receipt of impact or vibration.

In the present invention, however, the joining piece 63 of the lid 60 is caught by the joining hole 75 formed in the rear top cover 122 so as to keep the socket 30 swung forward, making it possible to prevent the socket 30 from rising in the direction of arrow A and from being vibrated. In this case, the storing section 70 of the lid 60 is exposed to the outside. However, since the socket 60 is housed in the storing section 70, the upper surface of the storing section 70 is concealed from view by the socket 60. Where the flat panel display unit 40 is joined to the socket 30, the lid 60 closing the opening 31 of the socket 30 is removed so as to open the socket 30. Then, the plug 43 protruding from the central portion of the lower part of the display unit 40 is inserted into the socket 30. These socket 30 and the plug 40 are fixed to each other by the fixing screw 33, and head of the fixing screw 33 is covered with the front cover panel 50 mounted to the front surface of the socket 30.

On the other hand, the lid 60 removed from the socket 30 is held in the holding section 7 formed in the base body 10 such that the plural claws 61, the stopper projections 62 and the joining piece 63 formed on the back surface of the lid 60 are engaged with the grooves 71, 72 and the hole 75 formed on the bottom of the storing portion 70.

In the embodiment described above, the lid 60 is stored in the storing portion 70 of the base body 10 when the socket 30 need not be covered with the lid, with the result that it is impossible for the lid to be lost. It is also impossible for the operator to fail to remember where the lid 60 is held. It should also be noted that the storing portion is formed in the lower part of the socket 30. Since the storing section 70 is formed near the socket, the lid can be easily mounted to and detached from the socket. Further, the lid 60 received in the storing section 70 is not obstructive because the storing section is formed in the dead space. Still further, the upper surface of the lid is substantially flush with the upper surface of the base body 10, leading to a good appearance of the apparatus.

Figure 9:
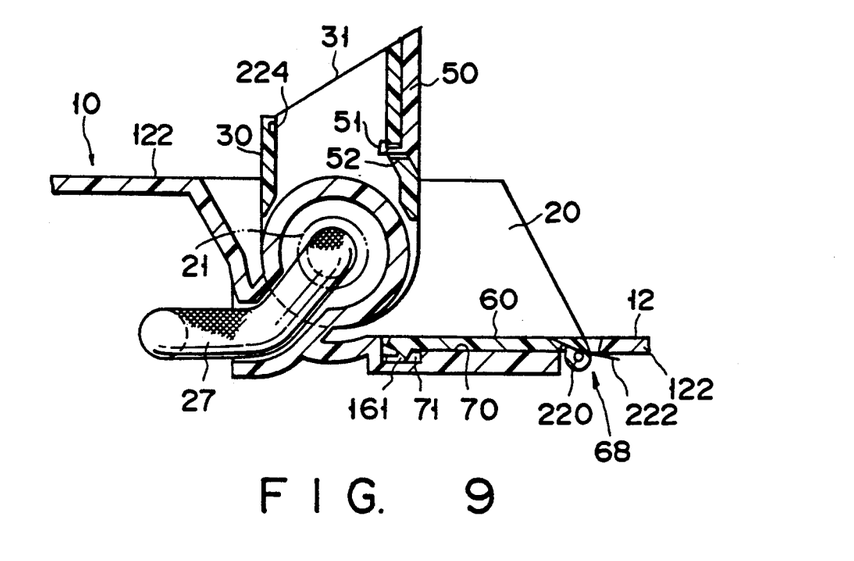
FIG. 9 is a cross sectional view showing a second embodiment of the present invention, in which the lid is not placed to cover the opening of the socket from which the plug has been removed.
Figure 10:
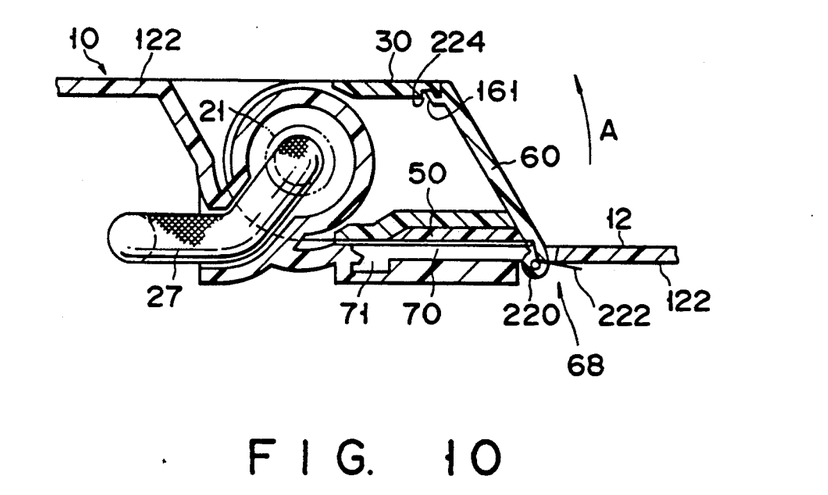
FIG. 10 is a cross sectional view showing that the opening of the socket is closed with the lid.

FIGS. 9 and 10 collectively show a second embodiment of the present invention. The second embodiment differs from the first embodiment described above in that, in the second embodiment, the lid 60 is swingably pivoted to the rear top cover 122 by a pivot 220. The pivot 220, which is one of the joining means, is provided with a twisted spring 222 serving to urge the lid 60 in the counterclockwise direction in the drawing. Where the opening 31 of the socket 30 is covered with the lid 60, the lid 60 is swung upward against the urging force of the twisted spring 222. Under this condition, the socket 30 is pushed forward such that the lid 60 abuts against the opening 31 of the socket and an engaging claw 161 mounted to the lid is engaged with an engaging recess 224 formed on the inner surface of the socket 30.

In the second embodiment shown in FIGS. 9 and 10, the edge portion of the lid 60 is joined by the pivot 220 to the base body 10, and the lid 60 is joined by the pivot 220 to the base body 10, and the lid 60 is urged by the twisted spring 222. As a result, the socket 30 is prevented from being swung in the direction denoted by an arrow A and from being loosened by vibration or the like. It follows that the socket 30 is kept pushed forward and prevented from rising from the pushed position. Where the lid 60 is removed from the opening 31 of the socket 30 to permit the socket to rise, the lid 60 is automatically housed in the storing portion 70 because of the urging force of the twisted spring 222.

Figure 11:
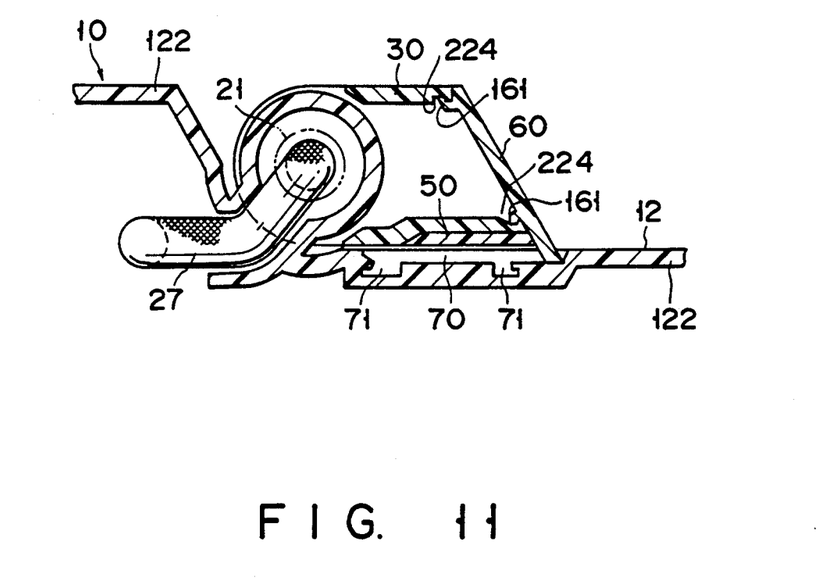
FIG. 11 is a cross sectional view showing a third embodiment of the present invention, in which the opening of the socket is closed with the lid.

FIG. 11 shows a third embodiment of the present invention. The third embodiment differs from the first embodiment in that, in the third embodiment, the lid 60 covering the opening 31 of the socket 30 is not joined to the base body 10.

Figure 12:
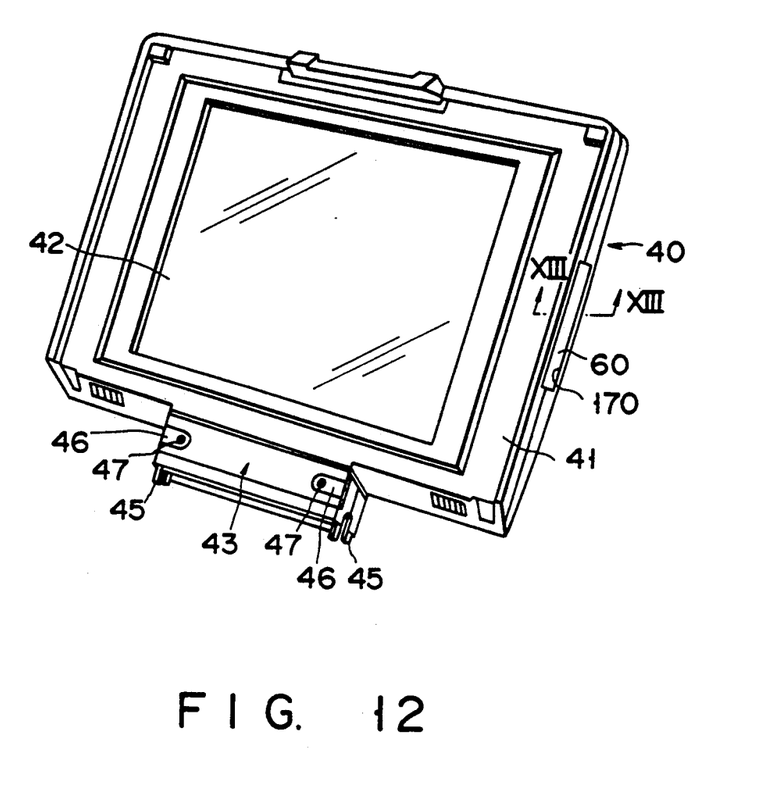
FIG. 12 is an oblique view showing a fourth embodiment of the present invention, in which the lid is housed in the display unit.
Figure 13:
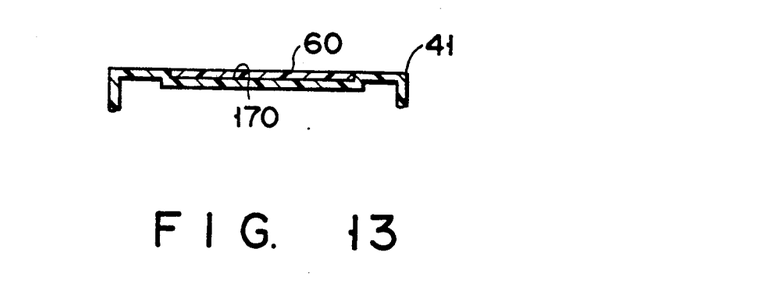
FIG. 13 is a cross sectional view along the line XIII—XIII shown in FIG. 12.

FIGS. 12 and 13 collectively show a fourth embodiment of the present invention. In this embodiment, the lid 60 is preserved in the frame 41 of the display unit 40. As seen from the drawings, a storing portion 170, which is of a recess shape, is formed in, for example, a side wall of the frame 41 of the display unit 40. The lid 60 detached from the socket 30 is received in the storing portion 170. It should be noted that the depth of the storing portion 170 is determined such that the outer surface of the lid held in the storing portion 170 is substantially flush with the surface of the frame 41 of the display unit 40.

In each of the embodiments described above, the keyboard 15 is formed integrally with the base body 10. However, it is possible for the keyboard to be formed separately from the base body 10. Where the keyboard 15 and the base body 10 are formed separately from each other, the storing portion of the lid 60 may be formed either in the keyboard or in the base body. Of course, the technical idea of the present invention can be applied to an electronic apparatus which does not comprise a keyboard. Further, the storing portion of the lid may be of a pocket structure employed in the embodiments described above. Still further, it is possible to use a screw for detachably engaging the lid with the base body 10 or with the frame 41 of the display unit 40.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

I claim:

1. A portable electronic apparatus, comprising:
   a casing comprising a base body housing electronic parts and having a rotatable socket portion defining an opening, and a display unit detachably mounted in the opening of the socket portion, said casing including a recess spaced from said socket portion and electrically isolated from the electronic parts;
   a display mounted in said display unit;
   a plug mounted to the display unit and detachably fitted into the socket portion;
   electrical connecting means, mounted in the socket portion, for electrically connecting said display unit to the electronic parts housed in the base body by fitting the plug into the socket portion;
   a detachable lid configurated to removably cover the opening of the socket portion when the display unit is detached from the base body, said lid being further configurated to fit into said recess when the lid is removed from the opening in the socket portion;
   mechanical connecting means, disposed in the opening of said socket portion and said lid, for detachably connecting said lid to cover the opening of said socket portion; and
   joining means, located on the base body, for joining the lid to the base body so as to prevent rotation of the socket relative to the base body, at times when the lid covers the opening of the socket relative to the base body, at times when the lid covers the opening of the socket portion.

2. A portable electronic apparatus, comprising:
   a casing comprising a base body housing electronic parts and having a rotatable socket portion defining an opening, and a display unit detachably mounted in the opening of the socket portion, said display unit including a frame having a recess disposed therein and spaced from said socket portion and electrically isolated from the electronic parts;
   a display disposed in and being housed by said frame;
   a plug mounted to the display unit and detachably fitted into the socket portion;
   electrical connecting means, mounted in the socket portion, for electrically connecting said display unit to the electronic parts housed in the base body by fitting the plug into the socket portion;

a detachable lid configured to removably cover the opening of the socket portion when the display unit is detached from the base body, said lid being further configured to fit into said recess when the lid is removed from the opening in the socket portion; and mechanical connecting means, disposed in the opening of said socket portion and said lid, for detachably connecting said lid to cover the opening of said socket portion.

3. The portable electronic apparatus according to claim 2, wherein the recess has a depth such that a surface of the lid held in the recess is substantially flush with a surface of the frame of the display unit.

4. A portable electronic apparatus, comprising:
a casing comprising a base body housing electronic parts and having a rotatable socket portion defining an opening, and a display unit detachably mounted in the opening of the socket portion, said casing including a recess spaced from said socket portion and electrically isolated from the electronic parts;
a display mounted in said display unit;
a plug mounted to the display unit and detachably fitted into the socket portion;
electrical connecting means, mounted in the socket portion, for electrically connecting said display unit to the electronic parts housed in the base body by fitting the plug into the socket portion;
a lid configured to removably cover the opening of the socket portion when the display unit is detached from the base body, said lid being further configured to fit into said recess when the lid is removed from the opening in the socket portion;
mechanical connecting means, disposed in the opening of said socket portion and said lid, for detachably connecting said lid to cover the opening of said socket portion;
joining means, located on the base body, for joining the lid to the base body so as to prevent rotation of the socket relative to the base body, at times when the lid covers the opening of the socket relative to the base body, at times when the lid covers the opening of the socket portion; and
wherein the joining means is a pivot rotatably pivoting the lid disposed in the recess, such that the lid is rotatably pivoted to close the opening of the socket portion.

5. The portable electronic apparatus according to claim 4, wherein the joining means is provided with a spring means urging the lid rotatably pivoted by the pivot such that the lid tends to fall toward the recess.

6. A portable computer comprising:
a base housing including an upper surface having a socket mounting portion, a keyboard exposing portion and a recess, the recess having a predetermined depth;
a socket pivotally mounted on the socket mounting portion and including a first opening and a first connector disposed in the first opening;
a display housing including a plug portion mechanically and removably connected to the socket and an inner surface having a display exposing portion, the display housing and the socket being rotatable between a closed position for covering the keyboard exposing portion and the recess and an opening position for exposing the keyboard exposing portion and the recess when the plug portion is connected to the socket, the plug portion including a second opening and a second connector disposed in the second opening, the second connector being removably connected to the first connector when the plug portion is connected to the socket;
a lid removably covering the first opening when the plug portion is removed from the socket and removably stored in the recess when the plug is connected to the socket, the lid having a predetermined height which is approximately equal to the predetermined depth of the recess; and
attaching means for removably attaching the lid to the first opening.

7. The portable computer according to claim 6, wherein:
the upper surface includes a socket storing surface, and the socket has a front surface covering the socket storing surface when the socket is in the closed position; and
the recess is disposed in the socket storing surface and is covered by the socket when the socket is in the closed position.

* * * * *

UNITED STATES PATENT AND TRADEMARK OFFICE
CERTIFICATE OF CORRECTION

PATENT NO.   :   5,253,139
DATED        :   October 12, 1993
INVENTOR(S)  :   Youji SATOU It is certified that error appears in the above-identified patent and that said Letters Patent is hereby corrected as shown below:

On the Title Page:
Abstract, front page, line 7, change "tie" to --time--.

Signed and Sealed this

Fourth Day of October, 1994

Attest:

Attesting Officer

BRUCE LEHMAN

Commissioner of Patents and Trademarks